Figure 1:
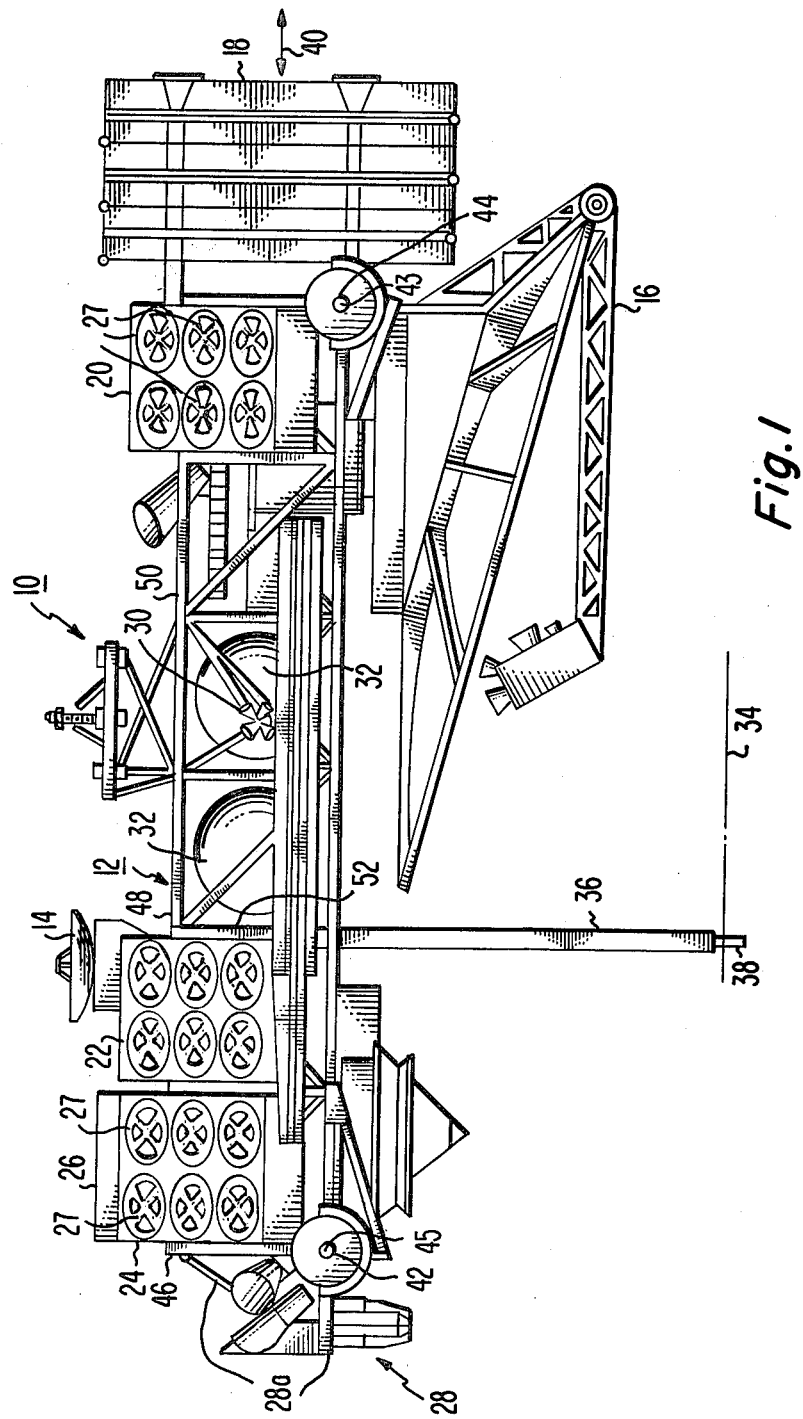

United States Patent [19]

Ganssle et al.

[11] 4,395,004
[45] Jul. 26, 1983

[54] MODULAR SPACECRAFT STRUCTURES

[75] Inventors: Eugene R. Ganssle, Skillman, N.J.; Nelson F. Samhammer, Fairless Hills, Pa.

[73] Assignee: RCA Corporation, New York, N.Y.

[21] Appl. No.: 133,251

[22] Filed: Mar. 24, 1980

[51] Int. Cl.³ .............................................. B64G 1/22
[52] U.S. Cl. ................................ 244/158 R; 244/160
[58] Field of Search ............... 244/137 R, 158 R, 159, 244/160, 161, 120

[56] References Cited

U.S. PATENT DOCUMENTS

| | | | |
|---|---|---|---|
| T100,604 | 5/1981 | Crill et al. | 244/158 R |
| 1,651,716 | 12/1927 | Klemm | 244/120 |
| 3,632,109 | 1/1972 | Dattner | 272/56.5 R |
| 3,722,153 | 3/1973 | Baer | 52/81 |
| 3,801,051 | 4/1974 | Hosterman et al. | 244/137 R |
| 3,953,948 | 5/1976 | Hogan | 52/81 |
| 4,057,207 | 11/1977 | Hogan | 244/159 |
| 4,213,586 | 7/1980 | Sengstock, Jr. | 244/158 |

OTHER PUBLICATIONS

"Analysis of Shuttle-Optimized DSCS III/Upper Stage Designs", vol. 1, Technical Analysis, Nov. 15, 1976.

*Primary Examiner*—Sherman D. Basinger
*Attorney, Agent, or Firm*—Joseph S. Tripoli; Robert L. Troike; William Squire

[57] ABSTRACT

Spacecraft structures which are suitable for mounting within the bay of a space shuttle. Each structure comprises a plurality of modules, each module in the form of a truss network, these networks being secured to one another. Electronic payloads, thrusters, fuel tanks, solar arrays and other equipment are attached to the trusses. The end modules of each spacecraft structure include adjustable trunnions to releasably secure the spacecraft structure to the shuttle. A module may include a keel for releasably securing it (and the spacecraft structure of which it is a part) to the shuttle. Each spacecraft structure may be individually designed. For example, the number of expansion modules secured between two end modules of a structure may be varied as required by the load carrying capacity desired of a spacecraft structure.

12 Claims, 5 Drawing Figures

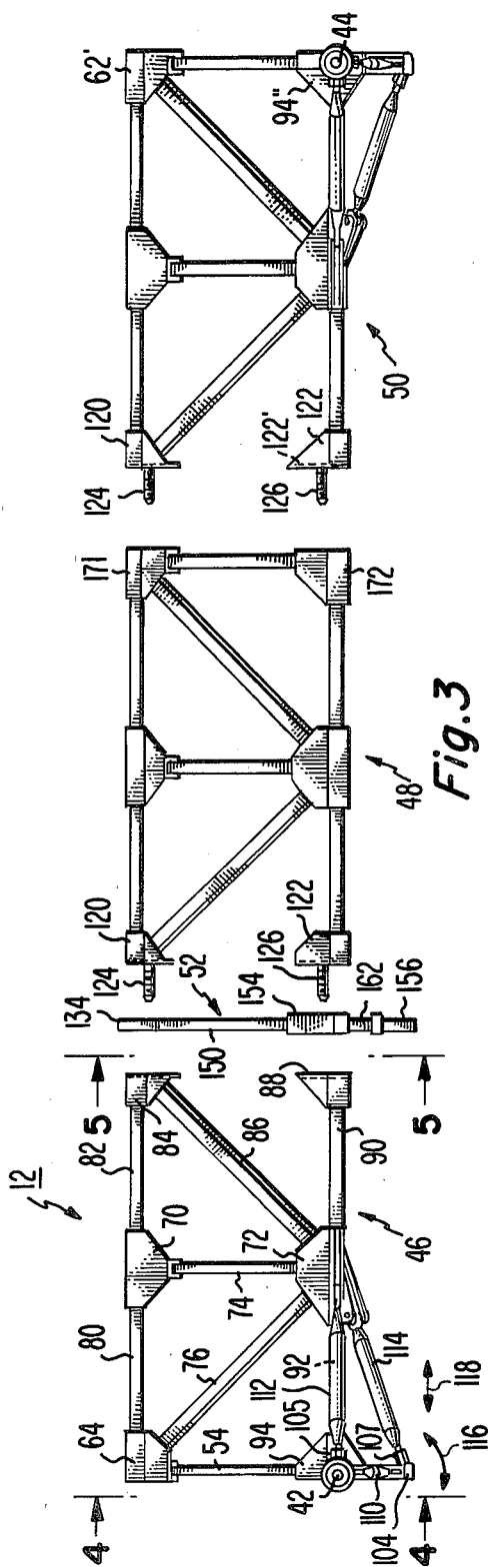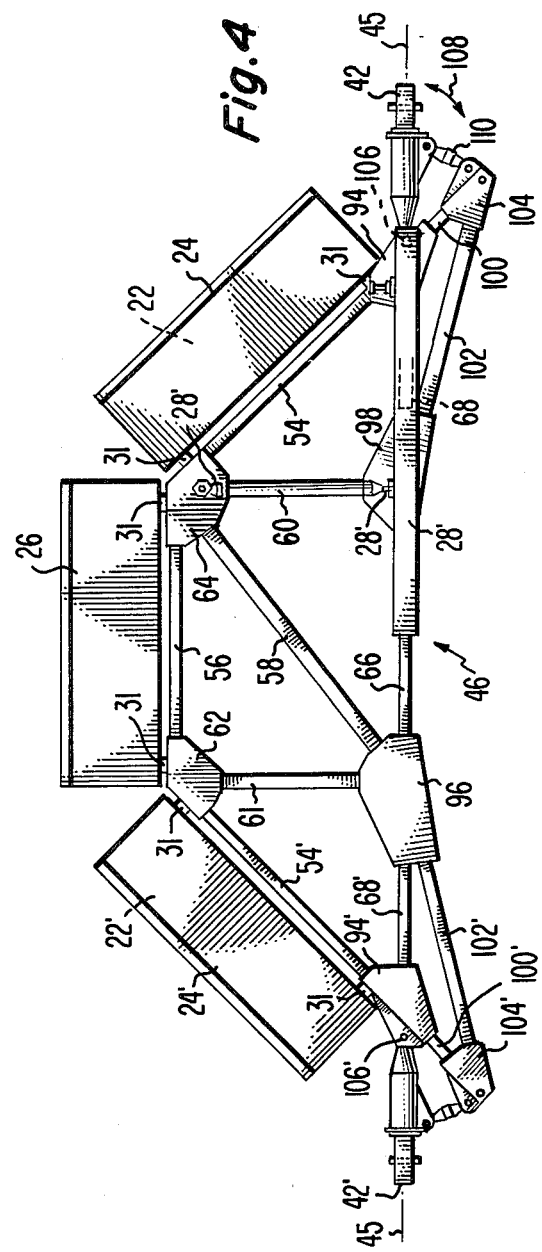

MODULAR SPACECRAFT STRUCTURES

The present invention relates to spacecraft structures and more particularly, to an expandable modular construction.

Prior spacecraft structures comprise a main frame to which engines, fuel tanks, and payload equipment and the like are attached. Prior so-called "modular" spacecraft, in fact, comprise a single main frame to which modular-type components or "black boxes" are assembled. In one form, the spacecraft main frame is divided up into modular compartments, all secured and integral with a common main frame. The modular compartments serve different spacecraft functions. For example, U.S. Pat. No. 4,009,851 illustrates a spacecraft structure comprising a hollow inner cylindrical member and a plurality of bulkheads secured to the cylindrical member. Payload equipment is secured to enclosure panels which are secured to the extended edges of the bulkheads to form an enclosed spacecraft structure. That particular type of spacecraft structure, however, does not lend itself easily to an expandable structure in which several main frame modules can be attached in accordance with a given need.

Other spacecraft structures comprise circular cylinders, elongated rectangles and numerous other shapes. The main frame of each of these crafts, however, like the structure in the aforementioned patent, are surrounded with payload equipment and do not lend themselves readily for modular expansion. Further, future spacecraft may all be required to be deployed in a common design launch vehicle such as the space shuttle now being developed. This latter restriction further limits spacecraft construction design.

An expandable spacecraft structure embodying the present invention comprises a structure adapted to be stored in a launch vehicle. The structure supports components which form a spacecraft. The structure and components are launched from the launch vehicle when the latter is in space. The structure includes a first module comprising a first support body including means adapted to receive the components. The body includes a first pair of trunnion members extending in opposite directions from the body. The trunnion members are adapted to be received in respective trunnion receiving means in the launch vehicle. The body includes first mounting means for securing another body to the first support body.

Keel structure means include second mounting means secured to and mating with the first mounting means and include a keel member adapted to engage the receiving means on the launch vehicle. The keel member extends in a direction normal to the direction of the trunnion members. The second mounting means is adapted to receive third mounting means from the another body.

In the Drawing

Figure 2:
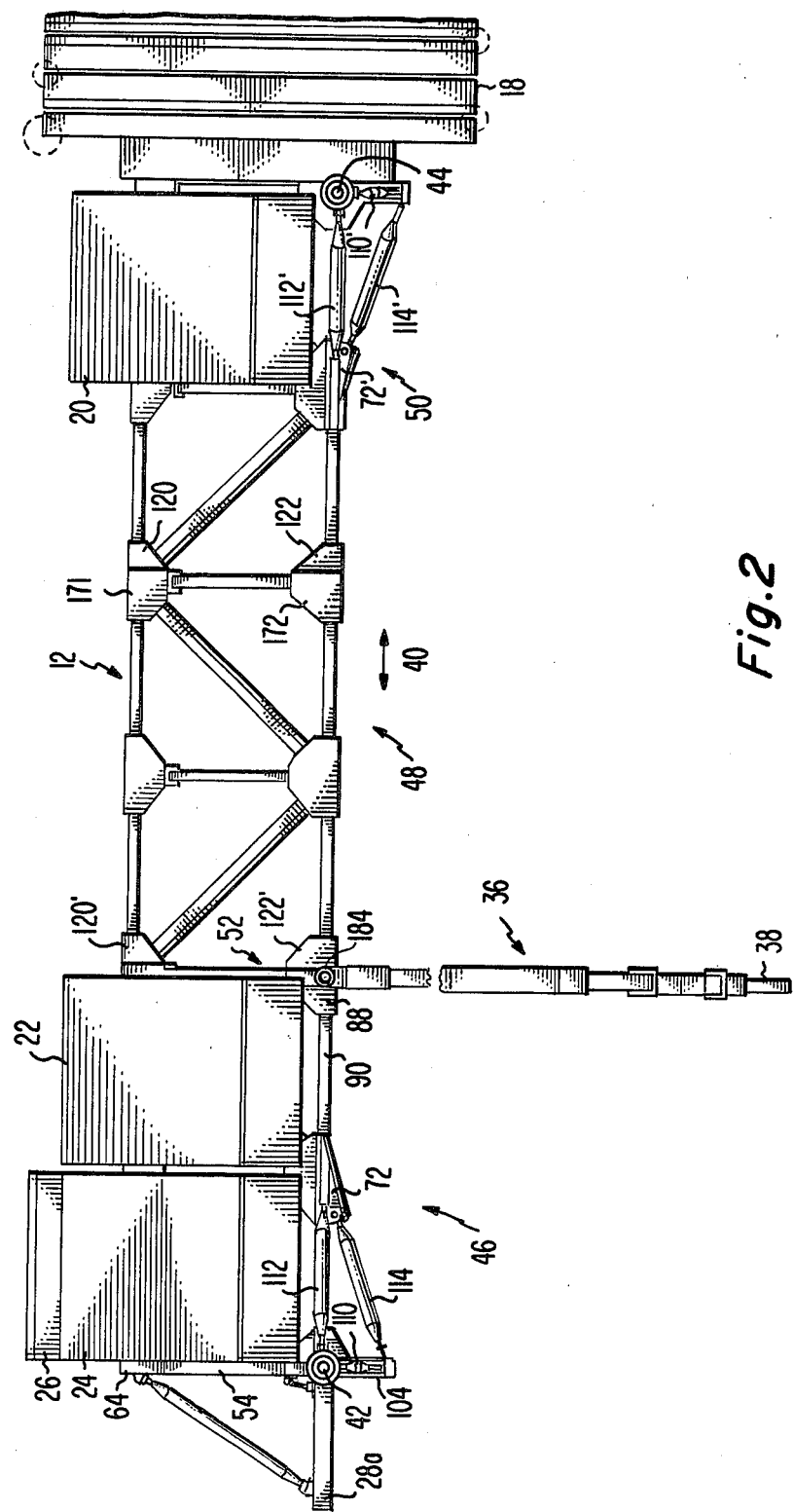
Figure 5:
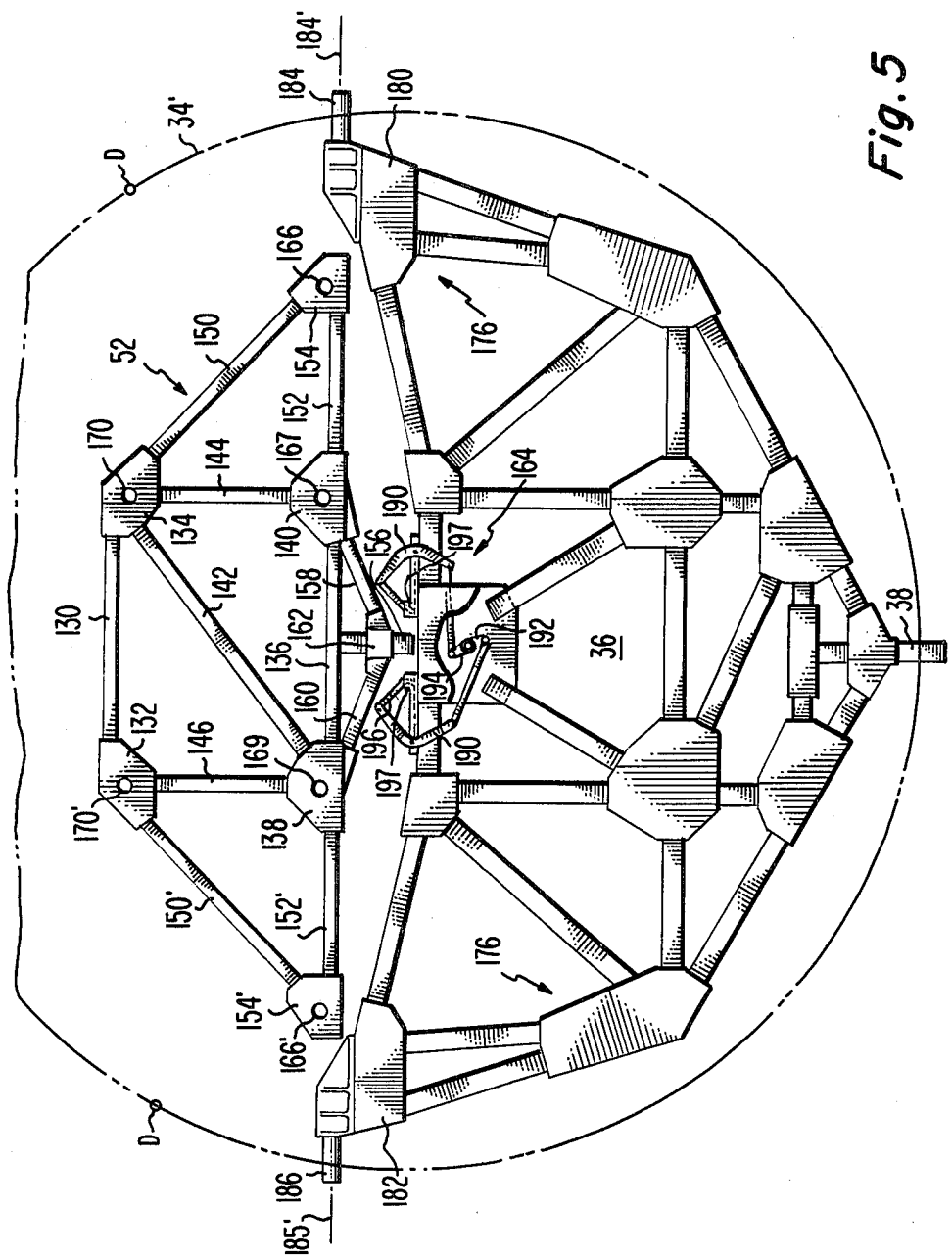

FIG. 1 is a side elevational view of a spacecraft embodying the present invention, FIG. 2 is a side elevation view of the spacecraft modules forming the support structure of the embodiment of FIG. 1, FIG. 3 is an exploded view of the modules of FIG. 2, showing the modules in more detail, FIG. 4 is an end view taken along lines 4—4 of FIG. 3 and further including payload apparatus secured to the module of FIG. 3, and FIG. 5 illustrates the keel structure and its spaced relationship with the supporting cradle mounted in a bay of a space shuttle taken along lines 5—5 of FIG. 3.

Presently under development is a spacecraft launch vehicle known as the space shuttle. The space shuttle is a craft which is launched by rockets from the earth and is reusable in the sense that when it finishes its mission in space, it can be flown back to earth. The shuttle has a body somewhat similar to that of a conventional aircraft in that it is an elongated circular cylinder. The body forms a cargo bay in which are stowed spacecraft to be launched into space from the shuttle after the shuttle reaches an orbiting position in space. It is contemplated that the spacecraft to be launched from the shuttle are secured to the shuttle by means of structures known as cradles which provide an interface between the spacecraft and the cargo bay of the shuttle. A number of different spacecraft may be secured to a like number of different cradles end-to-end within the cargo bay for launch from the shuttle. Each spacecraft has its own cradle. The cradle is a reusable structure which returns to the earth with the shuttle after its spacecraft is launched from the shuttle into space.

Because the shuttle is designed to be reusable, the cargo bay has reusable spacecraft securing fittings for securing the cradle and spacecrafts thereto of a given design configuration. For example, at the base of the shuttle cargo bay running the longitudinal length of the floor of the bay are keel receiving means for receiving a depending keel rod from a cradle. Running along opposite side walls of the cargo bay are two pair of rails on opposite sides which receive spacecraft and/or cradle trunnions. The trunnions extend from the cradle and may also extend from the spacecraft for securing the spacecraft to the cargo bay. The trunnions and keel rods are releaseably secured to the cargo bay by means located in the shuttle.

The releaseable feature is required because different manufacturers launching their own spacecraft will have their own particular cradle for launching that spacecraft. Therefore, once the shuttle returns to earth with the spent cradle, that cradle is removed from the cargo bay and a different manufacturer with its spacecraft and coupled cradle are then mounted into the cargo bay of the shuttle. The trunnions can extend either from the cradle or from the spacecraft in accordance with the desired designed configuration. The cradle can have any shape as the manufacturer desires.

The only given restriction is the basic design of the shuttle cargo bay and its trunnion and keel receiving means.

With this background in mind, the present invention relates to a structural modular spacecraft framework which can be secured to a cradle and then mounted within the space shuttle cargo bay. The spacecraft structure of the present invention is modular in the sense that starting with a single structure, additional similar structural modules may be added thereto end-to-end to change the length of the desired spacecraft structure in accordance with a given implementation. Each structural module has identical mounting means on the ends thereof which mate with the mounting means of any other module which can be attached thereto in any sequence. Further, a keel structure can be attached to any one of the modules for mating with the cradle within the cargo bay. The modules forming the structure of the spacecraft to be described comprise truss networks which receive the components making up the spacecraft, such as thrusters, fuel tanks, antennas, solar cell arrays, guidance systems, electronic communications equipment, infrared detectors and other mission systems such as those used for controlling the spacecraft, communicating with the spacecraft from earth, and for providing power and control systems for operating the spacecraft. Depending on a particular mission, more or fewer of these add-on components which make up the completed spacecraft, may be required for a given mission. Depending on the number of components required, the spacecraft in one implementation may be small as compared to a relatively large version for another implementation. The apparatus described below comprises spacecraft structures which are made up of modules, each module comprising a truss network. A group of modules are connected to one another, in the manner described in detail below, to make up a spacecraft which is launched from the shuttle after the latter is in space (usually in a desired orbit in space). The design of each spacecraft is a function of the number of modules employed and the apparatus (thrusters, electronics, antennas and so on) secured to each module. The individual spacecraft structures within a shuttle may be the same as or different from one another, as desired, and may include more or fewer modules, as desired.

In FIG. 1, spacecraft 10 includes a modular main frame structure 12, to be described. Attached to the main frame structure 12 are payload apparatus including an expandable antenna 14, a foldable antenna 16, a folded array of solar generators 18, payload equipment modules 20, 22, 24 and 26, an instrument measuring platform and associated equipment 28, and its mounting platform structure 28a, thrusters 30, fuel tanks 32, and other structures required for this particular spacecraft. The spacecraft 10 is secured within the bay of a launch vehicle, which may be a space shuttle such as is presently under development in the United States.

In FIG. 1 the broken line 34 represents the axis of the keel rod receiving means within the cargo bay of the space shuttle. The cradle 36 secures the spacecraft structure 10 to the space shuttle at 34 via keel rod 38 which mates with a suitable receptacle (not shown) at 34 in the shuttle cargo bay. The main frame structure 12 supporting the various spacecraft components described above is a modular construction which is capable of expanding in the directions 40 along the length of the shuttle cargo bay in accordance with any given implementation. That is, relatively few basic modular main frame structures provide a number of different length (in directions 40, for example) spacecraft structures of similar design. The completed modular assembled spacecraft frame structure has trunnions and at least one keel rod to secure the spacecraft to the predetermined fixed design cargo bay of the space shuttle.

In FIG. 1 a trunnion 42 is at one end and a second trunnion 44 at the other end of frame 12. Trunnions 42 and 44 are elongated cylindrical pin members which extend out of and normal to the drawing. A set of like trunnions 42', 44', FIG. 4 (44' is behind 42' and not shown) extend normal to the drawing on the opposite side of the spacecraft and are axially aligned with trunnions 42 and 44 along axes 45 and 43, FIG. 1, respectively. A keel structure 52 has a keel rod 156 (FIG. 5) to be explained later, which secures the spacecraft 10 to cradle 36. The cradle 36 therefore serves as an intermediary or an expansion structure for securing the relatively short keel rod 156 on the spacecraft main frame structure 12 to the cargo bay. The cradle will be described in more detail below in connection with FIG. 5.

The main frame structure 12, FIG. 2, comprises a first trunnion module 46, so called because it carries a set of trunnions 42, 42', an expansion module 48, which does not have trunnions, and a second trunnion module 50. Between the trunnion module 46 and expansion module 48 is the keel structure 52 which does not have trunnions. The modules 46, 48 and 50 and structure 52 are bolted together in longitudinal directions 40 by interchangeable bolting or fastening devices as will be explained later.

In FIGS. 3 and 4 the trunnion module 46 comprises a truss network formed of a set of beams and gussets. Beams 54, 56, 58 and 60, FIG. 4, are connected at one end to gusset 64. Beams 56, 61, 54' are connected at one end to gusset 62. The elements which are primed are mirror images or otherwise identical to the unprimed elements. For example, beams 54 and 54' are the same. Beams 60, 66 and 68 are connected at one end to gusset 98 and beams 61, 58, 68', 102' and 66 are connected at one end to gusset 96. The base beams 66, 68 and 68' form with the beams 54, 56 and 54' a trapezoidal section. All of the modules have this section shape and together form a trapezoidal cylinder. The beam 54 slopes approximately 45° with the length of beam 66 which forms a straight line with beams 66 and 68'.

Additional beams are interconnected to the above structure to form an elongated truss network which forms module 46 as shown in FIG. 3. Gussets 70 and 72, FIG. 3, connect the beam 74 parallel to beam 54, beam 76 is connected between gussets 64 and 72, beam 80 is connected between gussets 64 and 70, beam 82 is connected between gussets 70 and 84, and beam 86 is connected between gussets 84 and 72. Beam 90 is connected between gussets 88 and 72. End gussets 84 and 88 and their opposite corresponding members 84' and 88' (not shown) each have a stud receiving hole (not shown) aligned with holes 166, 170, 170' and 166' of structure 52, FIG. 5, for receiving bolts or studs as will be explained. Beam 92 (not shown) behind brace 112, FIG. 3, is connected between gussets 72 and 94. All of the above lie generally in the plane of beam 54. A similar structure lying in the plane of beam 54' is provided on the opposite side of module 46. Further, additional beams (not shown), form structures similar to the structure of FIG. 4 parallel to beams 56, 61, 60, 58, 66, 68' and 68.

Beam 100, FIG. 4, is connected between gussets 94 and 104 and beam 102 is connected between gussets 98 and 104. On the other side of the module, beams 100' and 102' are connected between gussets 94', 104' and 96. Trunnions 42 and 42' are identical and are secured to the module 46 in an identical manner by identical elements. Therefore, only the connection of the trunnion 42 will be described. Trunnion 42 is rotatably secured to gusset 94 by ball and socket 106. This permits the trunnion 42 to rotate in any direction about socket 106. Threaded adjustment member 110 is connected between trunnion 42 and gusset 104 for adjusting the position of trunnion 42 in the elevational directions 108.

In FIG. 3, adjustable horizontal brace 112 connects the trunnion 42 to gusset 72. Threaded adjustment device 105 adjusts the angular position of trunnion 42 in azimuth. Thus, elevation and azimuth adjustment of trunnion 42 are provided by adjustment member 110 and device 105. Adjustable brace 114 is connected between gusset 72 and gusset 104 at an acute angle to a horizontal plane. The adjustment of trunnion 42 aligns it to the trunnion receiving means (not shown) in the space shuttle, which means lie in a common plane and may comprise a set of parallel rails running along the inner walls of the shuttle cargo bay. By making the trunnion 42 adjustable, its position on the trunnion module during initial construction need not be accurately determined by assembly tolerances, which could be costly in a truss network. Alignment of the trunnions can be made after the module is assembled. Such alignment can be done by optical or mechanical equipment.

The trunnion 42', FIG. 4, is assembled to the trunnion module 46 identically to trunnion 42 in mirror image orientation. It, too, can be independently adjusted and aligned after its assembly. The trunnions 42 and 42', after alignment, extend substantially along a common axis 45 in opposite directions from the trunnion module truss network. This common axis alignment depends on the relative position of the mating trunnion receiving elements in the cargo bay.

Gussets 62, 64, 94 and 94', FIG. 4 and gussets 70, 72, 84 and 88, FIG. 3, and other corresponding mirror image gussets on the module include mounting means such as threaded bolt holes (not shown) for receiving the various payload modules and equipment 20, 22, 24 and 26 via mounting studs 31. Payload equipment 24 and 24' are mounted parallel to the beams 54 and 54', respectively. Equipment 26 is mounted parallel to the beam 56. Equipment 22' is parallel to and behind equipment 24' (as viewed in the drawing) and opposite equipment 22 of FIG. 1. Similarly oriented equipment opposite equipment 20, FIG. 1, is also behind equipment 24'. Each of these equipment modules 20-26 comprise a rectangular shell enclosure housing the spacecraft control, power, communications and mission systems. Louvers 27, FIG. 1, provide thermal control.

A somewhat triangular configuration permits the spacecraft to fit within the circular configuration of the space shuttle cargo bay. Placement of the load equipment on top of the spacecraft next adjacent the cargo bay doors (not shown) at the top of the drawing, FIGS. 4 and 5, permits easy access to the equipment when the spacecraft is mounted in the cargo bay. This is best seen by dashed line 34' and points D,D, FIG. 5, representing the space shuttle cargo bay wall, and the hinge points for the doors, respectively.

The trunnion module 50, FIG. 3, may be constructed identically to the trunnion module 46 with one exception. The gussets 120 and 122 corresponding to the gusset member 84 and 88 of the module 46 differ. The gussets 120 and 122 each have a stud 124 and 126, respectively, secured thereto. Gussets 120' and 122' (not shown) on the other side of the module 50 have similar studs. The stud 124 extends parallel in a horizontal direction and mates with a hole (not shown) in the gusset 84. The stud 126 is parallel to stud 124 and can mate with a hole (not shown) in the gusset 88. Further the payload mounting holes may also differ in the different modules. In all other respects, the trunnion module 50 truss configuration can be identical to that of module 46. The trunnions 44 and 44' (not shown) of module 50 are constructed identically to and adjustable in the same manner to their axis 43, FIG. 1, as the trunnions 42 and 42' of the module 46 as described above. The trunnions in both modules are at one end of that module.

Keel structure 52, FIG. 5, includes a beam 130 connected between gussets 132 and 134 and parallel to beam 56, FIG. 4. Beam 136 is parallel to member 130 and is connected between gussets 138 and 140. Gussets 138 and 140 are aligned with gussets 96 and 98, into the drawing of FIG. 4, respectively. A cross beam 142 is connected between gussets 134 and 138 while upstanding beams 144 and 146 extend between gussets 134 and 140, and 132 and 138, respectively. The beams 150 and 152 are connected at one end to gusset 154 and at the other end to gussets 134 and 140, respectively. Beams 150' and 152' are connected to gusset 154' at one end and to gussets 132 and 138 at the other end, respectively. All of the keel structure elements just described are coplanar and occupy approximately the same cross section area as module 46, FIG. 4, less the trunnion support structure (beams 100-102, etc.). The depending keel rod 156, FIG. 5, is secured to beam 136 and to gussets 140 and 138 by beams 158 and 160 and connector 162. Keel rod 156 is a relatively short cylindrical member which is locked to the cradle 36 by locking mechanism 164 forming part of the cradle 36.

In FIG. 5, the gussets 154, 154' are respectively formed with bolt holes 166 and 166'. Bolt holes 166, 166' respectively receive and are aligned with studs 126, 126', FIG. 3, of the trunnion module 50. Gussets 132 and 134 have bolt holes 170' and 170, respectively, which can receive the respective studs 124, 124' from the trunnion module 50, FIG. 3, which are also aligned therewith. Holes 167 and 169 are in respective gussets 140 and 138. Studs (not shown) on module 50 are aligned with these holes. The studs on module 50 are sufficiently long to extend through the respective bolt holes of structure 52 and through the corresponding holes in the corresponding gussets of the trunnion module 46, FIG. 3. These studs can then be bolted to lock the trunnion module 50 to the trunnion module 46 with the keel structure 52 therebetween. In the alternative, separate bolts can be substituted for the studs. In this case the gussets mounting the studs have holes such as holes 166, 170 and so forth. The above arrangement of the modules, however, is not shown in the drawing. This is mentioned to illustrate the flexible modular effect of the structures provided.

The trunnions 42, 42', 44 and 44' are provided at the far end of the trunnions modules 46 and 50 to provide stability to the modular spacecraft structure when interconnected and secured to the space shuttle, dashed line 34', FIG. 5. However, this particular position of the trunnions is not essential.

In FIGS. 2 and 3 the expansion module 48 comprises a truss network of beams and gussets similar in construction to the trunnion module 50. The difference is that the trunnions 44 and 44' (not shown) and their associate support structure are not included in the expansion module 48, otherwise, the modules 48 and 50 are the same in construction. All the modules 46, 48 and 50 and the keel structure 52 have the general trapezoidal shape shown in FIGS. 4 and 5. Expansion module 48 also includes studs 124, 124' (not shown) extending from respective gusset members 120 and 120' in the same alignment as the respective studs 124, 124' of module 50 and as the respective holes 166, 166', 167, 169, 170 and 170' in the keel structure of FIG. 4 and in the trunnion module 46 of FIG. 2. Stud 126 extends from gusset member 122 in the module 48 in alignment with the bolt hole 166 in the keel structure 52 of FIG. 5. Gussets 171 and 172 of module 48 include bolt holes therein which are aligned with the respective bolt holes in gussets 84 and 88 of module 46.

The studs on the expansion module 48 align with the corresponding bolt holes on the keel structure 52 and the trunnion module 46 in identical fashion as the studs on the trunnion module 50.

The various gussets and beams on the modules, whether a trunnion or expansion module, include mounting provisions such as threaded mounting bosses 31, FIG. 4, for mounting the various payload, engine, thrusters, fuel tanks and other equipment in accordance with a given implementation. Particular mounting provisions such as bosses 31 for securing the various equipments to the modules can be provided the modules in accordance with the configuration of the structures to be then secured thereto. These mounting provisions can vary from module to module. In the spacecraft 10 of FIG. 1, the structure there comprises trunnion module 46 connected to the keel structure 52, the expansion module 48 and then the second trunnion module 50 in that order. All of the trunnions of the modules are aligned, axes 43, 45, FIGS. 1 and 4, of the respective trunnion pairs 44, 44' and 42,42' being aligned in a common plane. Depending on a particular mission implementation, only the keel structure need be secured to the module 46 to form a smaller spacecraft assembly. On other occasions it may be desirable to assemble the module 46 to keel structure 52 to trunnion module 50 omitting the expansion module 48. In still other cases a number of expansion modules 48 may be assembled intermediate the trunnion modules 46 and 50. In accordance with those implementations, additional keel structures 52 may be attached to a single spacecraft structure between various expansion modules. It will thus be apparent various modules and keel structures may be interconnected in a variety of different arrangements to provide a flexible set of spacecraft modules which can meet many design requirements.

In FIG. 5 the cradle 36 comprises a coplanar array of truss elements 176 comprising beams and gussets. The outline of the cradle 36 follows a somewhat circular shape as formed by the space shuttle bay indicated by the broken line 34'. Secured to the gussets 180 and 182 on the cradle are oppositely facing trunnions 184 and 186, respectively. The trunnions 184 and 186 have axes 184', 185' which lie on a common fixed axis which is coplanar with the plane in which axes 43 and 45 of trunnions 42, 42', 44 and 44' lie. At the base of the cradle 36 is downwardly depending keel rod 38. Rod 38 mates with the keel receptacle within the cargo bay of the space shuttle. Keel locking assembly 164 is secured at the central upper portion of the cradle 36. Assembly 164 secures the keel rod 156 to the cradle 36. Locking assembly 164 comprises a plurality of linkages including a bell crank 190, which are connected at one extreme end to outwardly extending radial arms 192 and 194 attached to a motor. The other end of the linkages at 196 abut against slides 197 which abut keel rod 156 when the arms 192 and 194 rotate clockwise and free rod 156 when rotated counter-clockwise. This mechanism is activated by a suitable control (not shown). That mechanism is operated to lock the keel structure thereto. When the spacecraft is to be launched from the space shuttle, the linkages and bell crank 190 are activated in the opposite direction to release the keel rod 156. A single cradle 36 is sufficient to secure the entire spacecraft of FIG. 1 to the keel of the space shuttle (not shown). The trunnions secure the spacecraft in the vertical direction and in one horizontal direction (fore and aft). The keel structure secures the spacecraft in the other horizontal direction (laterally).

What is claimed is:

1. A structure adapted to be stored in a launch vehicle, said structure supporting components which together with the structure form a spacecraft, the spacecraft to be launched from the launch vehicle when the latter is in space, said structure comprising:

a first module comprising a first support body having a given longitudinal extent including means adapted to receive said components, said body including a first pair of trunnion members extending in opposite directions from said body, said trunnion members being adapted to be received in respective trunnion receiving means in said launch vehicle, said body including first mounting means for securing another body to said first support body, and a substantially planar keel structure means of a thickness much less than said longitudinal extent of said first support body and including second mounting means secured to and mating with said first mounting means and including a keel member adapted to engage said receiving means on said launch vehicle, said keel member extending in a direction normal to the direction of said trunnion members, said second mounting means being adapted to receive third mounting means from said another body.

2. The structure of claim 1 further including cradle structure means including a pair of trunnion members extending in said opposite directions adapted to be received in said launch vehicle, and keel locking means on said cradle structure means for receiving and releaseably securing said keel member thereto.

3. The structure of claim 1 wherein said another body includes a second module comprising a second support body including means adapted to receive said components, a second pair of trunnion members extending in like opposite directions as the trunnion members of the first module, and adapted to be received in said trunnion receiving means, said second body including said third mounting means mating with said first and second mounting means.

4. The structure of claim 3 further including trunnion adjust means for individually aligning each said trunnion member to a reference alignment.

5. The structure of claim 3 further including at least one expansion module secured between said first and second modules and including fourth and fifth mounting means at opposite ends thereof, said fourth mounting means mating with and secured to said first and second mounting means, said fifth mounting means mating with and secured to said third mounting means.

6. The structure of claim 5 wherein the first, second and fifth mounting means include female connecting means and said third and fourth mounting means include male connecting means.

7. The structure of claim 6 wherein said modules and keel structure means are serially connected in a direction approximately normal to said opposite directions.

8. The structure of claim 1 wherein said module and keel structure means each comprise a plurality of beam elements connected in a truss network.

9. The structure of claim 1 wherein said module and keel structure means form a segment of a right cylinder.

10. The structure of claim 1 further including trunnion adjust means for individually aligning each said trunnion members.

11. A structure adapted to be stored in a launch vehicle, said structure supporting components which together with the structure form a spacecraft, the spacecraft to be launched from the launch vehicle when the latter is in space, said structure comprising:

a first structural truss module including a support body having a given longitudinal extent and means for securing said components to said body, means for securing a pair of trunnion members to said body extending in opposite directions from said body, said trunnion members being adapted to be received in respective trunnion receiving means in said launch vehicle, said body including first mounting means for securing thereto another body substantially identical to said support body, and a substantially planar keel structure means of a thickness much less than said longitudinal extent of said support body and including second mounting means secured to and mating with said first mounting means and including a keel member for engaging keel receiving means on said launch vehicle, said first and second mounting means including fastening means spaced in an identical array.

12. The structure of claim 11 further including a second structural truss module attached to said keel means, said second module including means for securing thereto said another modular support structure, and said another support module substantially identical to said first module attached to said second module at said latter means for securing said another module including means for securing a second pair of trunnion members extending from said another module in said opposite directions.

* * * * *